United States Patent [19]
Marley et al.

[11] Patent Number: 5,243,766
[45] Date of Patent: Sep. 14, 1993

[54] WHEEL ALIGNMENT MEASUREMENT SYSTEM

[75] Inventors: Christopher M. Marley; David Pink, both of Northants, United Kingdom

[73] Assignee: V. L. Churchill Ltd., United Kingdom

[21] Appl. No.: 923,863

[22] Filed: Jul. 31, 1992

[30] Foreign Application Priority Data

Aug. 1, 1991 [GB] United Kingdom ............... 9116650

[51] Int. Cl.$^5$ .......................................... G01B 11/275
[52] U.S. Cl. .................................... 33/288; 33/203.18; 356/155
[58] Field of Search ................. 33/288, 203.18, 203.19, 33/203.15, 203.16, 203; 356/153, 155, 152

[56] References Cited

U.S. PATENT DOCUMENTS

| | | | |
|---|---|---|---|
| 3,855,709 | 12/1974 | Hirmann | 33/203 X |
| 4,319,838 | 3/1982 | Grossman et al. | 33/288 X |
| 4,402,603 | 9/1983 | Lill | 356/155 X |
| 4,523,844 | 6/1985 | Titsworth et al. | 33/288 X |
| 5,018,853 | 5/1991 | Hechel et al. | 356/155 |

*Primary Examiner*—William A. Cuchlinski, Jr.
*Assistant Examiner*—Alvin Wirthlin
*Attorney, Agent, or Firm*—Basile and Hanlon

[57] ABSTRACT

A vehicle wheel alignment measurement system includes four infra-red emitter-detector units fixed by clamps to the vehicle wheels. Each unit includes a beacon and a rotatable detector coaxial with the beacon and driven by a motor. Angular rotation of the detector is sensed and signals from the four units are analyzed by a signal processing computer to give absolute position and relative angular measurements of the four wheels.

9 Claims, 1 Drawing Sheet

WHEEL ALIGNMENT MEASUREMENT SYSTEM

BACKGROUND OF THE INVENTION

1. Field of the Invention

This invention relates to a wheel alignment measurement system for motor vehicles.

2. Description of the Prior Art

Some previous wheel alignment measurement systems have been of limited usefulness since they were not able to measure angle data for each of the wheels independently.

Other prior proposals have involved the use of stationary frames, limiting the usefulness of the system because it had to be at a fixed location to which the vehicle was brought.

In British Patent No. 0257144, a versatile wheel alignment measurement system was described, capable of measuring and analyzing data from all four wheels. However, it was a skilled and time-consuming job to set up the system since six angle sensors were required and these had to be connected together by flexible elements stretching between the wheels. Furthermore, the signal outputs from the sensors had to be assigned the correct electrical polarity for analysis purposes. The individual angle sensors were also prone to damage.

In U.S. Pat. No. 4,319,838, it has been proposed to use pairs of symmetrically-disposed electronic signal generators coupled to the vehicle wheels to detect their angular deviation from a line of sight between detectors. The arrangement requires the presence of six detectors, each of which relies on a pair of side-by-side photodiodes to sense the deviation. The results rely solely on calculation based on the readings of the sensors, so misalignment of the diodes or other components may give rise to inaccuracy.

In other prior systems, such as that described in U.S. Pat. No. 4,095,902 signal emitters are used in combination with reflectors, but this is unsatisfactory in that the reflection diminishes the signal strength.

SUMMARY OF THE INVENTION

It is an object of the present invention to provide a new or improved wheel alignment measurement system.

According to the invention there is provided a wheel alignment measurement system comprising four units, each unit comprising a signal source, a signal detector rotatably mounted coaxially with the source and having a restricted detection window and controlled motor means for rotating the detector to detect signals from each of the other signal sources.

The four units may be mounted in two pairs, one pair rearwardly of the front wheels of a vehicle and one pair forwardly of the rear wheels of a vehicle whereby each unit is in line of sight of each of the other units.

Preferably the signal sources and signal detectors are infra-red signal sources and signal detectors.

A signal processor may be provided which is adapted to receive and analyze the outputs of the signal detectors. Display means may be provided for the output of the signal processor, which may comprise a computer.

The controlled motor means for each unit may comprise a stepper motor. Alternatively, it may comprise an electric motor having angular rotation detection means.

The angular rotation detection means may comprise a rotatable toothed wheel driven by the motor and counter means to determine the angular rotation of the toothed wheel.

The detector may be rotated by the motor (of either type) via a gearbox. Preferably, the gearbox ratio and the motor are selected so as to give calibration of the rotation of the signal detector in minutes of arc.

BRIEF DESCRIPTION OF THE DRAWINGS

An embodiment of the invention will now be described in more detail by way of example only with reference to the accompanying drawings in which.

DESCRIPTION OF THE PREFERRED EMBODIMENT

Figure 1:
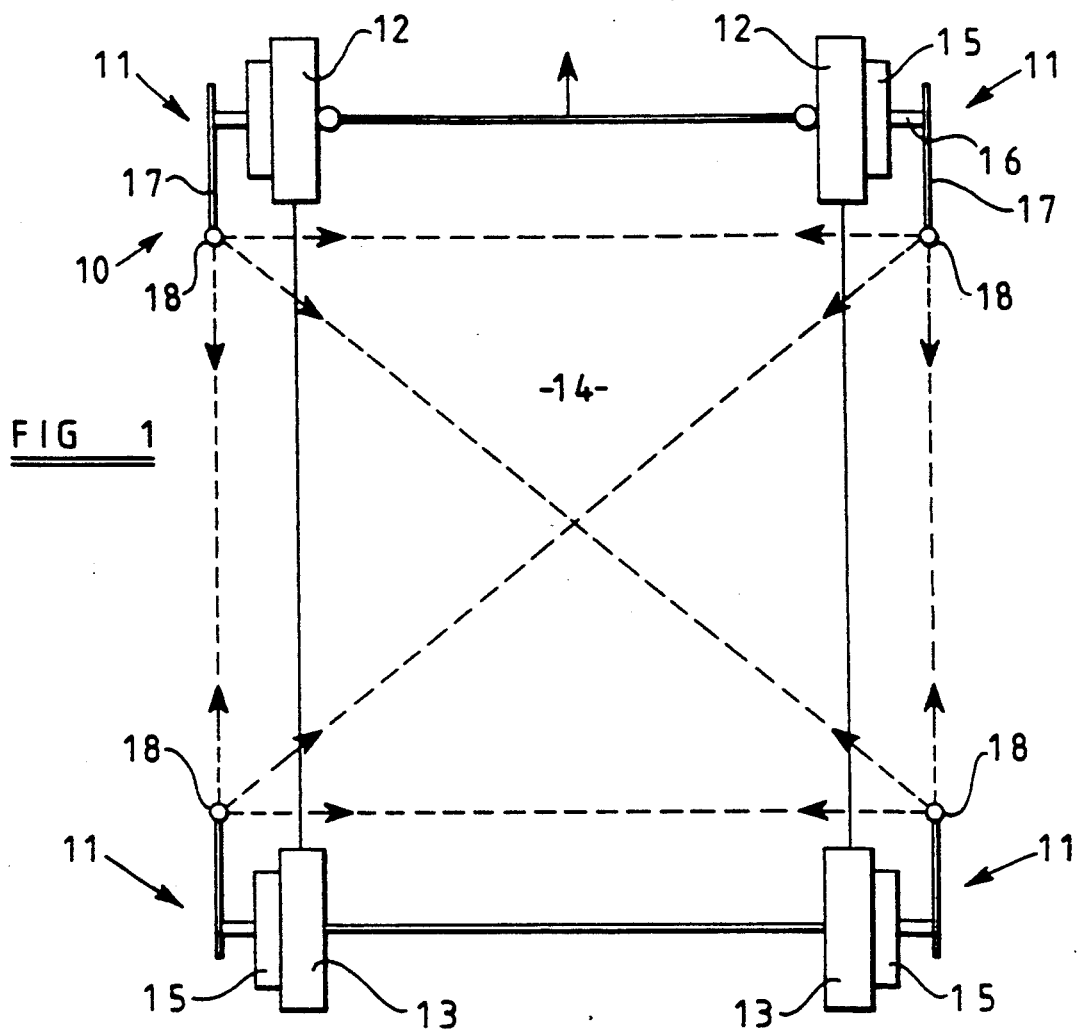
FIG. 1 is a diagrammatic plan view of a vehicle fitted with the wheel alignment measurement system of the present invention.

Referring to the drawings, a wheel alignment measurement system is generally indicated at reference number 10 and comprises four units, each generally indicated at reference number 11, one for fitment to each of the wheels 12, 13 of a vehicle 14.

The front wheels of the vehicle, 12 are indicated at the top of FIG. 1 and the rear wheels 13 are shown at the bottom.

Figure 2:
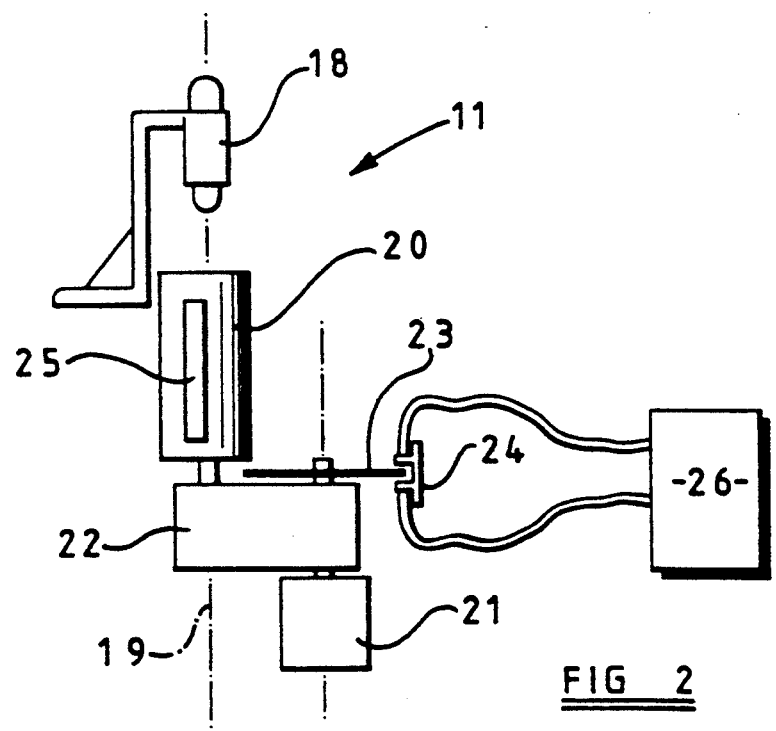
FIG. 2 is a diagrammatic elevational view illustrating one form of a unit adapted to be used as part of the system.

Each wheel 12, 13 has an identical unit 11 mounted thereon. The units 11 are illustrated in more detail in FIG. 2. The units 11 are secured in place to the respective wheels 12, 13 by clamps 15 of a generally known type which clamp to the outer face of the vehicle wheel. A stub 16 extends from the wheel clamp 15 and carries a projecting arm 17 on which the operating parts of the unit 11 are mounted in rigid fashion.

Each unit 11 comprises an infra-red beacon 18 which emits infra-red light. Mounted coaxially with the beacon 18 on the axis shown in chain-dotted lines by reference number 19, there is provided an infra-red detector. The detector is in the form of a rotatable drum 20 which is rotated by an electric motor 21 through a gearbox 22. In the example shown, the motor 21 is a DC electric motor having a rotation detection means comprising a rotating disc 23 which rotates in unison with the motor 21 and which has a toothed edge. As the teeth of the disc 23 pass a counter 24, a signal is produced and the amount of rotation of the motor can therefore be detected. This rotation is stepped down through the gearbox 22 so that very precise measurement can be made of the angular rotation of the detector drum 20 due to the motor rotation. It is preferred that the disc 23 should have 360 teeth and the gearbox should have a ratio of 60:1 so that each revolution of the motor 21 is subdivided into 21,600 individually countable parts, representing minutes of arc.

As an alternative to the illustrated motor, disc and counter arrangement, a stepper motor 21 can be used, again acting through a gearbox to rotate the detector drum 20. In this case, a stepper motor having 400 steps per revolution is stepped down through a 54:1 gearbox to provide measurements of individual minutes of arc.

The detector drum 20 has a narrow slit 25 which will receive infra-red rays along a narrow line. The arrangement of the units 11 shown in FIG. 1 of the drawings enables each detector drum 20 to have a clear line of sight of the beacons 18 of each of the other three units 11.

It will be appreciated that, when the detector drums 20 are rotated, the relative angular positions of each of the other three beacons 18 are registered and appropriate signals can be sent by the counters 24 to a central control means such as a computer 26.

However, the line of transmission from the left rear wheel 13 to the right rear wheel 13 and vice versa ought in theory to be one and the same if the wheels 13 are exactly parallel. Where the wheels 13 are not parallel, the difference between the actual and theoretical lines can be calculated to give the angle readings of individual wheels 13. Because of the triangulation possible between the transmitters 18 and detectors, it is also possible to establish the exact absolute position of each sensor/detector unit relative to a datum position as well as the relative angles. From these measurements, all of the necessary wheel alignment angles can be calculated and it is intended that this function should be carried out under computer control, the input to the computer 26 being derived from the motor rotation signals from the counters 24 of the four units 11.

It will be appreciated that the arms 17 are exactly perpendicular to the projecting stubs 16 and hence exactly parallel to the wheel clamps 15. Height adjustment means may be provided as it may be necessary to level the arms 17 so that all the units lie in a common plane.

The units 11 are provided in two pairs of opposite hands. Together with the wheel clamps 15 and associated wiring, the whole apparatus is portable and does not require the presence of a fixed stationary frame. It also does not require any physical connections between the vehicle wheels.

We claim:

1. A wheel alignment measurement system comprising four units, mounted in two pairs, one pair rearwardly of front wheels of a vehicle and the other pair forwardly of rear wheels of the vehicle whereby each unit is in line of sight of each of the other units, each unit comprising a signal source, a signal detector rotatably mounted coaxially with the signal source and having a restricted detection window and controlled motor means for rotating each signal detector to detect signals from each of the other signal sources.

2. The system according to claim 1 wherein the signal sources and the signal detectors are infra-red signal sources and signal detectors.

3. The system according to claim 1 wherein a signal processor is provided to receive and analyze the outputs of the signal detectors.

4. The system according to claim 3 wherein the signal processor comprises a computer.

5. The system according to claim 1 wherein the controlled motor means for each unit comprises a stepper motor.

6. The system according to claim 1 wherein the controlled motor means for each unit comprises an electric motor having angular rotation detection means.

7. The system according to claim 6 wherein the angular rotation detection means comprises a rotatable toothed wheel driven by the electric motor and counter means mounted adjacent the toothed wheel for determining angular rotation of the toothed wheel.

8. The system according to claim 1 wherein the signal detector is rotated by the controlled motor means via a gearbox.

9. The system according to claim 8 wherein a ratio of the gearbox and controlled motor means are selected so as to give calibration of rotation of the signal detector in minutes of arc.

* * * * *